United States Patent
Jaffe

(10) Patent No.: US 10,417,584 B2
(45) Date of Patent: Sep. 17, 2019

(54) TRIP PLANNING AND IMPLEMENTATION

(71) Applicant: Uber Technologies, Inc., San Francisco, CA (US)

(72) Inventor: Howard David Jaffe, Pacifica, CA (US)

(73) Assignee: Uber Technologies, Inc., San Francisco, CA (US)

( * ) Notice: Subject to any disclaimer, the term of this patent is extended or adjusted under 35 U.S.C. 154(b) by 481 days.

(21) Appl. No.: 14/746,766

(22) Filed: Jun. 22, 2015

(65) Prior Publication Data
US 2015/0371157 A1  Dec. 24, 2015

Related U.S. Application Data

(60) Provisional application No. 62/015,284, filed on Jun. 20, 2014.

(51) Int. Cl.
*G06Q 10/02* (2012.01)
*G06Q 10/10* (2012.01)
*G06Q 50/14* (2012.01)
*G06Q 50/30* (2012.01)
*G08G 1/0967* (2006.01)

(52) U.S. Cl.
CPC ....... *G06Q 10/025* (2013.01); *G06Q 10/1097* (2013.01); *G06Q 50/14* (2013.01); *G06Q 50/30* (2013.01)

(58) Field of Classification Search
CPC .. G06Q 10/025; G06Q 50/30; G06Q 10/1097; G06Q 50/14
See application file for complete search history.

(56) References Cited

U.S. PATENT DOCUMENTS

| | | | |
|---|---|---|---|
| 4,023,753 A | 5/1977 | Dobler | |
| 5,953,706 A | 9/1999 | Patel | |
| 7,840,427 B2 | 11/2010 | O'Sullivan | |
| 9,939,279 B2 | 4/2018 | Pan | |
| 2001/0037174 A1 | 11/2001 | Dickerson | |
| 2004/0225520 A1 | 11/2004 | Aoki et al. | |

(Continued)

OTHER PUBLICATIONS

How does Uber Work? available at https://help.uber.com/h/738d1ff7-5fe0-4383-b34c-4a2480efd71e (Year: 2016).

(Continued)

*Primary Examiner* — Garcia Ade
(74) *Attorney, Agent, or Firm* — Mahamedi IP Law LLP

(57) ABSTRACT

A system and method are provided which obtain a travel itinerary for a user, the itinerary identifying a trip, including a scheduled flight to a destination. A scheduled flight is monitored to detect when the scheduled flight arrives at the destination. Upon the scheduled flight arriving at an airport of the destination, one or more notifications are sent to a mobile computing device of the user. Information can be provided with the notifications for an on-demand ground transportation service. The information may include a location at the airport where the user can be picked up in connection with receiving the on-demand transportation service, and a timing indicator to indicate when the user should make a request to receive the on-demand transportation service based on a real-time determination of a number of available service providers in a vicinity of the airport.

18 Claims, 8 Drawing Sheets

(56) References Cited

U.S. PATENT DOCUMENTS

| | | |
|---|---|---|
| 2005/0278192 A1 | 12/2005 | Cantini et al. |
| 2006/0293937 A1 | 12/2006 | Sohm |
| 2008/0177584 A1 | 7/2008 | Altaf et al. |
| 2009/0030885 A1 | 1/2009 | DePasquale |
| 2010/0153279 A1 | 6/2010 | Zahn |
| 2010/0211498 A1 | 8/2010 | Aabye et al. |
| 2011/0225257 A1 | 9/2011 | Tilden et al. |
| 2011/0251951 A1 | 10/2011 | Kolkowitz et al. |
| 2012/0072249 A1 | 3/2012 | Weir et al. |
| 2013/0018795 A1 | 1/2013 | Kolhatkar et al. |
| 2014/0025410 A1* | 1/2014 | Churchman ........... G06Q 10/06 705/6 |
| 2014/0149157 A1 | 5/2014 | Shaam et al. |
| 2014/0172727 A1 | 6/2014 | Abhyanker |
| 2015/0032485 A1 | 1/2015 | Nelson |
| 2015/0161554 A1 | 6/2015 | Sweeney |
| 2015/0176997 A1* | 6/2015 | Pursche ............... G08G 1/0967 340/905 |
| 2015/0206267 A1 | 7/2015 | Khanna |
| 2016/0138928 A1 | 5/2016 | Guo |
| 2016/0148167 A1 | 5/2016 | Li |
| 2017/0169366 A1 | 6/2017 | Klein |

OTHER PUBLICATIONS

ISR and Written Opinion dated Sep. 14, 2017 in PCT/US2017/036430.
International Search Report in related PCT/US2015/045325 dated Nov. 25, 2015.
Introducing Scheduled Rides: Plan Your Trip in Advance—Lyft Blog; http://blog.lyft.com/posts/introducing-scheduled-rides, May 23, 2016.
Office Action in EP 15809070.4 dated Sep. 27, 2018.
EESR in 15809070.4 dated Nov. 8, 2017.

* cited by examiner

TRIP PLANNING AND IMPLEMENTATION

RELATED APPLICATIONS

This application claims the benefit of priority to U.S. Provisional Patent Application No. 62/015,284, filed Jun. 20, 2014, titled PROVIDING RECOMMENDED ITINERARIES FOR A TRIP OF A USER; the aforementioned application being incorporated by reference in its entirety.

BACKGROUND

A conventional way for a user to plan for travel is for that user to first book a flight by visiting a website for an airline or a website for a travel booking company. The user can then book a hotel from either the same website for the travel booking company or by visiting a separate website for a hotel. In some instances, the user can also reserve a rental vehicle from the same website for the travel booking company or by visiting a website for a vehicle rental company.

DETAILED DESCRIPTION

Figure 1:
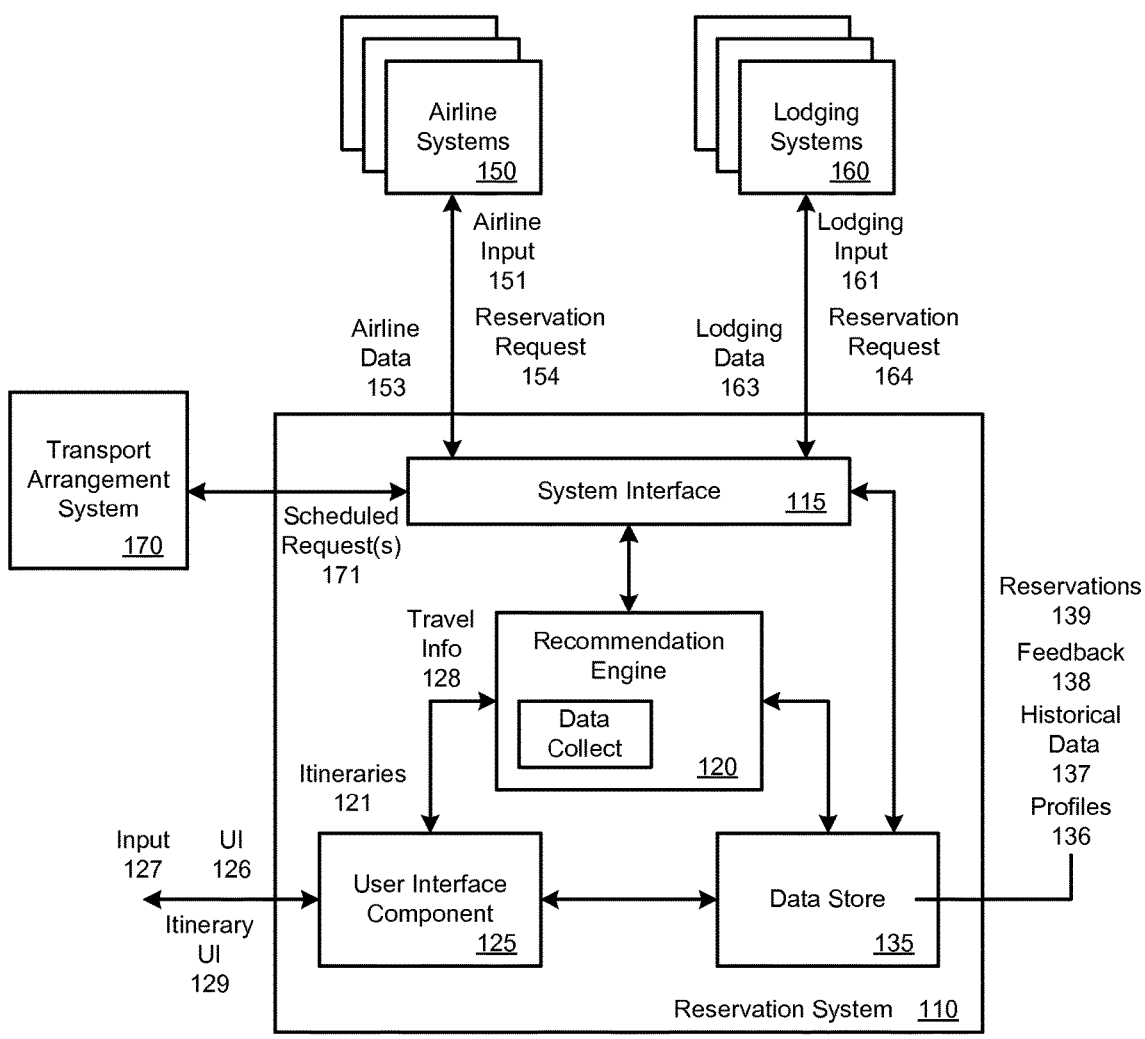
FIG. 1 illustrates an example system for providing recommended itineraries for a trip of a user.

A system and method are provided which obtain a travel itinerary for a user, the itinerary identifying a trip, including a scheduled flight to a destination. A scheduled flight is monitored to detect when the scheduled flight arrives at the destination. Upon the scheduled flight arriving at an airport of the destination, one or more notifications are sent to a mobile computing device of the user. Information can be provided with the notifications for an on-demand ground transportation service. The information may include a location at the airport where the user can be picked up in connection with receiving the on-demand transportation service, and a timing indicator to indicate when the user should make a request to receive the on-demand transportation service based on a real-time determination of a number of available service providers in a vicinity of the airport.

Still further, some examples described herein provide for a system and a method for providing recommended itineraries for a trip of a user based on the user's specified travel information. A recommended itinerary can provide a comprehensive or end-to-end itinerary for the user from the beginning of the trip (e.g., from a user-specific start location at a start date and/or time) to the end of the trip (e.g., to a user-specific return location at a return date and/or time), as opposed to a typical itinerary that simply provides information about a selected flight and information about a selected hotel.

According to some examples, a reservation system can determine a set of initial travel information of a trip for a user based on received user input. As used herein, a set of initial travel information refers to information that is specific to a particular user and that defines the parameters of the user's trip. For example, a set of initial travel information can include one or more of (i) a start location indicating where the trip is to begin, (ii) a start date and/or time indicating when the trip is to begin, (iii) a destination location (e.g., a location that the user wishes to travel to), (iv) a return location indicating where the trip is to end, and (v) a return date and/or time indicating when the trip is to end. Still further, as used herein, a trip refers to an event or a journey that begins from the user-specified start location and ends at the user-specified end location. The duration of the trip lasts from the start date and/or time to the return date and/or time. A trip can include one or more other locations that the user travels to during the duration of the trip.

The reservation system can communicate, over one or more networks, with a plurality of airline systems, a plurality of lodging systems, and/or a plurality of intermediary systems (e.g., systems that communicate with the airline systems and/or lodging systems, such as third-party travel booking systems) to receive a set of data from the individual systems based on one or more initial travel information from the set of initial travel information provided by the user. The reservation system can use the received set of data to determine one or more recommended itineraries for the trip for the user. The one or more recommended itineraries can be provided on a user interface to enable the user to view the details about the one or more recommended itineraries and/or make changes to one or more recommendations within a recommended itinerary. In one example, each recommended itinerary can include one or more transport service recommendations, one or more flight recommendations, and/or one or more lodging recommendations that cover the user's travel and transport needs for the entirety of the trip. In this manner, a single travel itinerary can be booked or reserved by the user through a single interface based on recommendations provided by the reservation system.

In some examples, the reservation system can communicate with at least one traditional hotel system as well as at least one shared-economy (or consumer-sharing) lodging system to access a variety of different types of lodging options for the user's trip when determining a lodging recommendation. By communicating with a combination of both traditional hotel systems and shared-economy systems, the reservation system can have a larger selection of lodging options to choose from in order to make a lodging recommendation for the user's specified trip.

Still further, the reservation system can communicate with an on-demand transport arrangement system to request one or more transport services to be arranged on behalf of the user in advance of the trip. The reservation system and the on-demand transport arrangement system can exchange data to enable pre-payment for the one or more transport services to be made. For example, typically, the on-demand transport arrangement system operates in real-time (or close to real-time) by receiving a real-time request for a transport service from a user at or around a time the user wants the transport service. By being in communication with the on-demand transport arrangement system, the reservation system can (i) automatically make a request for a transport service(s) for the user when the user books a recommended itinerary, or (ii) automatically make a request for a transport service(s) at around the time the user needs the transport service for the trip.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. Examples described herein may be implemented, in whole or in part, on computing devices or systems such as servers, datacenters, desktop computers, cellular or snnartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples can be carried and/or executed. In particular, the numerous machines shown with examples include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on snnartphones, multifunctional devices or tablets), and magnetic memory. Computers, terminals, network-enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 illustrates an example system for providing recommended itineraries for a trip of a user. A system, such as a reservation system 110 described in FIG. 1, can communicate with a plurality of airline systems 150, a plurality of lodging systems 160, a plurality of intermediary systems (not shown in FIG. 1), and/or an on-demand transport arrangement system 170 to provide one or more recommended itineraries for a trip of a user based on a set of user-specific initial travel information. As discussed, an intermediary system can be a system that communicates with a plurality of airline systems 150 and a plurality of lodging systems 160, such as a travel booking system, to enable a user to book flights and/or lodging using the intermediary system. For simplicity, examples of FIG. 1 are described without reference to intermediary systems. However, in some variations, the reservation system 110 can also communicate with one or more intermediary systems to receive data based on user-specific travel information in a similar fashion as discussed with respect to the airline systems 150 and the lodging systems 160.

According to one example, the reservation system 110 can include a system interface 115, a recommendation engine 120, a user interface (UI) component 125, and a data store 135. The components of the reservation system 110 can combine to (i) receive a set of initial travel information of a trip for a user based on received user input, (ii) communicate with the airline systems 150, lodging systems 160, and/or the intermediary systems to receive a set of data based on the set of initial travel information, and (iii) determine one or more recommended itineraries for the trip based on the received set of data. Depending on implementation, one or more components of the reservation system 110 can be implemented on a computing system, such as a server, laptop, PC, etc., or on multiple computing systems that can communicate with other systems over one or more networks. In some examples, a computing system can operate or execute an application to perform one or more of the processes described by the various components of the transport arrangement system. The reservation system 110 can also be implemented through other computer systems in alternative architectures (e.g., peer-to-peer networks, etc.).

The reservation system 110 can communicate, over one or more networks via a network interface (e.g., wirelessly), with airline systems 150, lodging systems 160, and the on-demand transport arrangement system 170 using the system interface 115. The system interface 115 can enable and manage communications between the reservation system 110 and the other systems. For example, the reservation system 110 and the other systems can exchange data with each other using application programming interfaces (APIs).

The UI component 125 can generate and provide one or more user interfaces (UI) 126 to be displayed on a display of a computing device. For example, the UI 126 can be accessible (over one or more networks) by a user's computing device via a portal, such as through a website or an application operable on the computing device. The user can interact with the UI 126 in order to provide input 127 for specifying the user's set of initial travel information 128 (see FIG. 2 as an example). According to some examples, after the user creates an account with the reservation system 110 or logs in to the user's account, the UI 126 can be displayed that includes features for receiving user input 127. The features can be associated with individual instructions or descriptions indicating what information is to be inputted by the user for planning an itinerary for the user's trip.

The user can provide input 127 to specify a set of initial travel information for a trip, including for example, (i) a start location indicating where the trip is to begin, (ii) a start date and/or time indicating when the trip is to begin, (iii) a destination location (e.g., a location that the user wishes to travel to), (iv) a return location indicating where the trip is to end, and/or (v) a return date and/or time indicating when the trip is to end. The recommendation engine 120 can receive the set of initial travel information 128 based on the received user input 127. In some examples, the UI component 125 can also provide the set of initial travel information 128 to the data store 135 so that the set of initial travel information 128 can be associated with the user's profile (of a plurality profiles 136) and stored in the data store 135.

In some examples, the recommendation engine 120 can also be in communication with the data store 135 to access user-specific data from the user's profile 136 when the user signs up with or logs in to the reservation system 110 via the portal. A user profile 136 can be associated with a particular user via a user name or other user identification, such as an e-mail address and/or phone number. Each user profile 136 can include user-specific information provided by a user, such as, for example, (i) information about one or more locations (e.g., an address for the user's home, an address for the user's office(s), an address for other locations frequently visited by the user, such as the gym, a relative's home, etc.), (ii) transport service preferences (e.g., vehicle type to be picked up in and dropped off in; vehicle color; specific requests for content within a vehicle, such as newspaper, water, gum, etc.), (iii) flight preferences (e.g., airline company; airplane type; size of airplane; aisle or window seat; time of flight, such as morning, afternoon, evening, etc.), (iv) lodging preferences (e.g., lodging company; lodging type, such as traditional hotels or bed-and-breakfast type or consumer-sharing lodging), (v) payment and billing information (e.g., bank account information; credit card information, etc.), and/or (vi) other user-specific information. Such information can be provided by the user in response to the user providing inputs 127 on UI 126.

The data store 135 can store historical data 137 for trips that were previously taken by users of the reservation system 110. Historical data 137 can be associated with user profiles 136. The data store 135 also store feedback information 138 about individual transport services, flights, and/or lodgings of trips that the user and other users of the reservation system 110 have taken or used. Such feedback information 138 can be provided by individual users after their individual experience with the transport services, flights, and/or lodgings. The recommendation engine 120 can access the historical data 137 and/or the feedback information 138 from the data store 135 for purposes of making recommendations for a trip of a user. For example, for a particular user, the recommendation engine 120 can use that user's historical data 137 and/or feedback information 138 as well as other users' historical data 137 and/or feedback information 138 to determine one or more recommended itineraries.

Referring back to the example above, a user who is planning a trip can sign in to the reservation system 110 and provide a set of initial travel information 128 for the trip. Once the user fills out the fields of the UI 126, the user can select a feature (e.g., "Search" or "Magic!") on the UI 126 to cause the reservation system 110 to process the data for purposes of providing recommended itineraries. When the recommendation engine 120 receives the set of initial travel information 128 for the trip, the recommendation engine 120 can communicate at least a portion of the set of initial travel information 128 to the airline systems 150 and/or the lodging systems 160 (if necessary), e.g., referred in FIG. 1 as airline input 151 and lodging input 161, respectively, to dynamically receive or retrieve a set of airline data 153 from one or more of the airline systems 150 and/or a set of lodging data 163 from one or more of the lodging systems 160. The airline input 151 and/or the lodging input 161 can be used to formulate queries for identifying the appropriate airline system(s) 150 and/or the appropriate lodging system(s) 160 and for identifying the set of airline data 153 and/or the set of lodging data 163 that is pertinent to or specific to the user's trip.

For example, based on the specified a start location and a start date/time, a destination location, and a return location and a return date/time, only one or more flight options from one or more airlines may be pertinent to the user's trip (e.g., flights that are departing and arriving in areas close to or within predefined distances of the specified locations and at times close to the dates/times). Similarly, only one or more lodging options from one or more lodging systems may be pertinent to the user's trip (e.g., lodging options that are in an area close to or within a predefined distance of the destination location and have available rooms during a dates/duration that the user is at or within the predefined distance of the destination location).

As described herein, a set of airline data 153 from an airline system 150 can include flight information of one or more flights (e.g., flight number, airplane type, starting airport, ending airport, etc.), flight times for the one or more flights (e.g., take off time, landing time, duration of the flight, etc.), and costs for the one or more flights (e.g., total cost, or broken down costs between airfare, taxes, etc.). Also as described herein, a set of lodging data 163 from a lodging system 160 can include lodging information of one or more rooms (e.g., single room, double room, king size bed, etc.), the check-in date/time and/or the check-out date/time, the duration of the stay, and costs for the one or more rooms (e.g., total cost, or broken down costs between rooms, taxes, etc.).

According to some examples, the data collect component of the recommendation engine 120 can receive or collect the initial set of travel information 128, the airline data 153, and/or the lodging data 163, as well as other information, such as information from the user's profile 136, historical information 137, and/or feedback information 138. The recommendation engine 120 can also include or communicate with a database of rules or parameters, where the rules or parameters can specify how the recommendation engine 120 is to determine one or more recommended itineraries. As an example, a rule can specify which data or information to use or to not use to determine a recommended itinerary (e.g., do not use historical information 137 or feedback information 138), and/or specify what weights are applied to which data or information (e.g., larger weights are applied to travel or lodging options that the user has previously taken or used and ranked highly as compared to other travel or lodging options). One or more rules in the database can be configurable by a user of the reservation system 110.

Based on one or more rules, the recommendation engine 120 can use the set of travel information 128 and the received data to generate one or more recommended itineraries for the trip for the user. In one example, the recommendation engine 120 can use a plurality of rules or parameters to determine multiple recommended itineraries, such as one set of rules for determining a recommended itinerary that is weighted heavily for lower prices for individual travel or lodging recommendations (e.g., travel or lodging options are given higher scores or rankings based on prices being lower than other options), another set of rules for determining a recommended itinerary that is weighted heavily for convenience of travel for the trip (e.g., travel or lodging options are given higher scores or rankings based on proximity to locations, shorter travel times, etc.), or still further, a third set of rules for determining a recommended itinerary that is weighted heavily for luxury or high ratings by users.

For each recommended itinerary, the recommendation engine 120 can determine one or more transport service recommendations to transport the user between locations (e.g., ground transport provided by a vehicle transport service), one or more flight recommendations to fly the user to and from airports, and one or more lodging recommendations (if necessary) to house the user when the user is at a destination. For example, although the user may need to fly from a start location to a destination location (e.g., San Francisco to Los Angeles), the user's start date and the return date can be on the same day, in which the recommendation engine 120 can automatically determine that no lodging is necessary. As an example of a recommended itinerary, based on the set of initial travel information 128, the recommendation engine 120 can determine that the user needs (i) a first transport service from the user's home to a first airport twenty miles away, (ii) a first flight from the first airport to a second airport in an area close to the destination, (iii) a second transport service from the second airport to a hotel, (iv) three nights in the hotel, (v) a third transport service from the hotel to the second airport, (vi) a second flight from the second airport to a third airport, and (vii) a fourth transport service from the third airport to the user's office. Each of the individual travel recommendations and lodging recommendation for a recommended itinerary can be selected based on each other, as the times and availabilities of one can influence the other.

In addition, for each recommended itinerary, the recommendation engine 120 can also provide a cost (or an estimated cost) for each of the travel and/or lodging recommendations and provide a total cost (or total estimated cost) for that itinerary. For example, the recommendation engine 120 can include the cost as provided by the airline system(s) 150 and/or the lodging system(s) 160 in the airline data 153 and/or the lodging data 163, respectively. Additionally, the recommendation engine 120 can provide, to the transport arrangement system 170, location information from the set of initial travel information 128 in order to receive a cost (or an estimated cost) for each of the transport service recommendation(s) (e.g., the cost can vary based on the distance between locations from a start to an end of a transport service). This cost can also be based on a recommended vehicle type specified by the recommendation engine 120. In this manner, the recommendation engine 120 can determine one or more recommended itineraries for a user, with each recommended itinerary corresponding to an end-to-end and comprehensive itinerary that substantially plans out or outlines the entirety of the travel and lodging facets of the trip.

Still further, the recommendation engine 120 can determine a plurality of recommended itineraries, and in some implementations, can rank the recommended itineraries. For example, ten different recommended itineraries can be determined and ranked (e.g., relative to each other from one to ten) so that the user can view the recommended itineraries in raking order one after the other. In other examples, recommended itineraries in a first set of recommended itineraries (e.g., that are weighted to favor lower/lowest prices) can be ranked relative to each other in the first set, recommended itineraries in a second set of recommended itineraries (e.g., that are weighted to favor convenience or lower/lowest travel times) can be ranked relative to each other in the second set, and so forth.

The recommendation engine 120 can provide the determined one or more recommended itineraries 121 to the UI component 125. The UI component 125 can provide the recommended itineraries 121 on or as part of an itinerary UI 129, in order to enable to view a recommended itinerary 121, to select between viewing different recommended itineraries 121, to adjust one or more travel and/or lodging recommendations, and/or to place an order (have the reservation system 110 make reservations on behalf of the user) using a recommended itinerary 121 (see FIG. 3 as an example). For example, the itinerary UI 129 can display a first recommended itinerary 121 (e.g., either the highest ranked itinerary or an itinerary that is weighted in favor of low or lowest prices). A user can select a feature to view additional or different recommended itineraries 121 on the itinerary UI 129. In other variations, two or more recommended itineraries 121 can be displayed concurrently on the itinerary UI 129 to enable the user to compare the recommendations, times, and/or costs between two or more recommended itineraries 121.

In another example, for a recommended itinerary, the recommendation engine 120 may have selected a first flight option as the first flight recommendation to be displayed on or shown with the recommended itinerary. The recommendation engine 120 can also provide, in response to a user input to modify or view other options, other flight options if the user wishes to select another flight. For example, the user can select a feature that causes another interface (e.g., a menu, a drop down menu, etc.) to be displayed, in which the other interface displays other flight options and/or their associated information. The user can select another flight option from that interface and in response, the recommendation engine 120 may, if necessary, dynamically change the times, the costs, the transport service recommendation(s), and other travel and/or lodging recommendations for that recommended itinerary (e.g., as a result of the change in flight times or locations, the lodging recommendation may have to be changed). In some variations, the recommendation engine 120 can retrieve airline data 153 and the lodging data 163 in response to receiving the user's input to change a recommendation in order to receive updated data 153, 163 based on the new user-specified information. In this manner, if the user determines that one of the recommended itineraries 121 is best suited for his or her trip, but not is not perfect to his or her liking, the user can modify one or more of the travel and/or lodging recommendations.

When the user is satisfied with a recommended itinerary 121, the user can select a feature on the itinerary UI 129 to order or checkout the selected recommended itinerary 121. In one example, the UI component 125 can receive user input 127 and notify the recommendation engine 120 that the user wishes to order or reserve the specified recommendations in the selected recommended itinerary 121. In response to the reservation system 1120 receiving the user input to order the selected recommended itinerary 121, the recommendation engine 120 can communicate with the respective airline system(s) 150 and/or the lodging system(s) 160 that provide the travel and/or the lodging recommendations specified in the selected recommended itinerary 121 in order to provide reservation requests on behalf of the user. The recommendation engine 120 can provide, via the system interface 115, a reservation request 154 to the airline system(s) 150 for reserving the one or more flight recommendations and a reservation request 164 to the lodging system(s) 160 for reserving the one or more lodging recommendations.

The recommendation engine 120 can provide the reservation requests 154, 164 to the respective systems along with user-specific information of the user (by previously accessing the user profile 136). Such user-specific information can include the user's name, address, billing information, payment information, contact information, government document information (e.g., passport number, citizenship information), etc., for reserving the different travel and/or lodging recommendations. In some examples, the user may have a pre-existing account or a profile with the airline system 150 and/or the lodging system 160. The recommendation engine 120 can provide the user's user name or rewards number to the associated systems if found in the user profile 136. In another variation, the reservation system 110 can, via the UI component 125, provide a UI to enable the user to provide such information for reservation purposes. The user can be charged at the time of reservation and/or when the user checks in or checks out of the lodging venue using the user's provided payment method and information.

The recommendation engine 120 can also communicate with the on-demand transport arrangement system 170 to provide one or more scheduled requests 171 to order or reserve the one or more transport service recommendations in the selected recommended itinerary 121. The scheduled request(s) 171 can also include information about the user (e.g., the user's name, email address, phone number, billing information, payment information) as well as the vehicle type and/or the time(s) the vehicle is needed for the one or more transport service recommendations. According to some examples, the user may already have a pre-existing account with the transport arrangement system 170. If the user has an account with the transport arrangement system 170, the account can store the user's specified payment method and information. By providing the scheduled request(s) 171 with the user's email address (and/or password), for example, the transport arrangement system 170 can make a reservation for the user for the one or more transport service recommendations using the user's payment method in the account (e.g., as opposed to the payment method in the profile 136 of the reservation system 110).

As an addition or an alternative, as discussed, the on-demand transport arrangement system 170 can arrange transport services between users and service providers (e.g., drivers) in real-time or close to real-time, as users make requests on-demand (as opposed to a scheduled reservation made days or weeks in advance). In such an example, the recommendation engine 120 may not transmit the scheduled request(s) 171 to the transport arrangement system 170 at the time the user order the selected recommended itinerary 121. The recommendation 120 can store information about the time(s) and/or the vehicle type(s) for the one or more transport service recommendations (e.g., as part of reservations information 139 in the data store 135). When it is time or close to time to make an on-demand request for the transport service (e.g., to transport the user from the start location to a first airport at the recommended time in the recommended itinerary 121), the recommendation engine 120 can transmit a request on behalf of the user to the transport arrangement system 170. Similarly, at a later time for another transport service (e.g., from the return pickup location to the return location), the recommendation engine 120 can transmit another request to the transport arrangement system 170 for another transport service.

After the reservations have been requested, the recommendation engine 120 can receive confirmation messages or emails from the airline system(s) 150, the lodging system(s) 160, and/or the transport arrangement system 170 that the reservations have been made for the user. The recommendation engine 120 can store the confirmation messages as reservations information 139 in the data store 135. In other examples, as an addition or an alternative, the user can receive notifications (e.g., emails) from these individual systems confirming that the reservations have been made. In this manner, the reservation system 110 can provide a variety of comprehensive recommended itineraries for a user based on the user's specific trip information to substantially cover the user's travel and transport needs for the entirety of the trip.

As an addition or an alternative, the reservation system 110 can be used or implemented (at least in part) by an enterprise, business, corporation, etc., where each employee of the enterprise (e.g., each user) can have an associated profile 136. Such a reservation system 110 can be used by employees when planning a business trip. The profiles 136 can be associated with back-office systems or human resource (employee personnel) information systems. In this manner, user specific-information, which can be used for some initial travel information 128, can be auto-populated for a user or included in a drop down menu for selection when inputting the set of initial travel information 128 on the UI 126. For example, the user's home address can be pre-associated with the user's profile 136. The user can input or select "Home" in a field for the start location and the user's home address can be automatically populated in the UI 126. Still further, the reservation system 110 can be in communication with the enterprise's financial system and/or expense system so that when reservations for a recommended itinerary are made through use of the reservation system 110, the user does not have to additional provide expense reports. The reservation system 110 can automatically bill the enterprise's financial system or use the financial system to make the reservations, or if the user's payment methods are used, automatically provide the expense and billing to the enterprise's expense system on behalf of the user.

User Interface Examples

Figure 2:
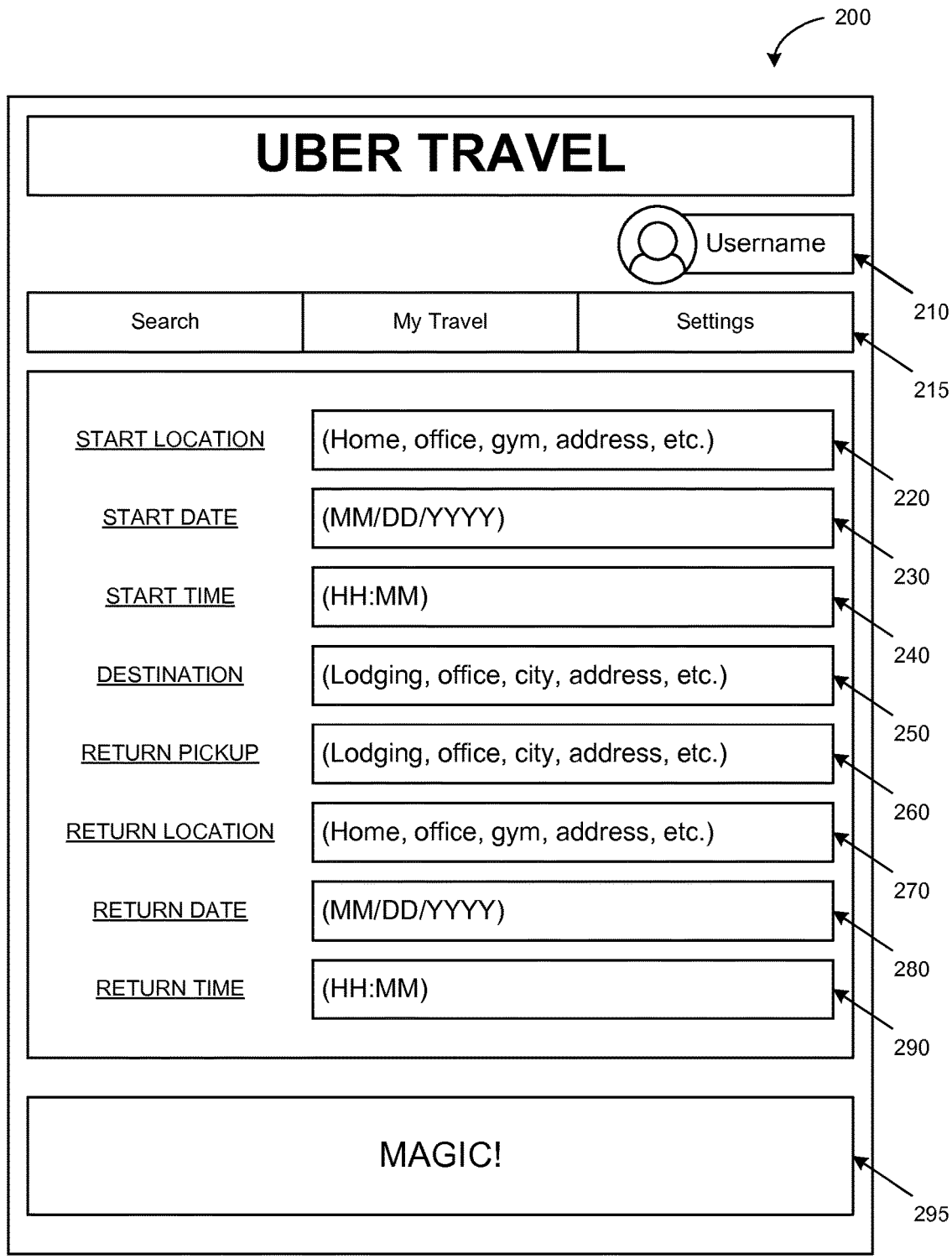
FIG. 2 illustrates an example user interface to enable the user to provide travel information for purposes of receiving recommended itineraries for a trip.

FIG. 2 illustrates an example user interface to enable the user to provide travel information for purposes of receiving recommended itineraries for a trip. For example, the input interface 200 of FIG. 2 can correspond to a UI 126 of FIG. 1, which can be accessed by a user using a computing device (via a portal, such as a website or an application). Such an input interface 200 can be displayed after the user signs up or logs in with the reservation system.

The input interface 200 can include a plurality of features and fields to enable the user to provide input via one or more input mechanisms of his or her computing device to specify a set of initial travel information for a trip. For example, a profile feature 210 showing the user's name or account user name, "Username," is displayed on the input interface 200 so that the user can select the feature 210 to view and/or edit various information in his or her profile with the reservation system (e.g., specify travel preferences, such as window seat versus aisle seat, or lodging preferences, etc.). The input interface 200 can also include set of additional features 215 to enable the user to search, view previous travels or upcoming travels, or change settings for the reservation system.

The input interface 200 can also include a variety of different features or fields that direct the user to provide information about the user's trip, including for example, (i) a start location field 220, (ii) a start date field 230, (iii) a start time field 240, (iv) a destination field 250, (v) a return pickup location field 260, (vi) a return drop off location field 270, (vii) a return date field 280, and/or (viii) a return time field 290. The user can manually type in information in the fields, or in some examples, selection of a field can provide drop down menus or additional user interfaces for selection. Although not illustrated in FIG. 2, the input interface 200 can also include other features to enable the user to add or specify other details, such as the number of people (adults, children, etc.) for the trip, requests for specific items in a transport service vehicle, etc.

In addition, although not illustrated in FIG. 2, the input interface 200 can also enable the user to input multiple trips for multiple destinations. For example, the user's trip can span from the start location (e.g., the user's home in San Francisco, Calif.) to a first destination location (e.g., a first office in Los Angeles, Calif.), to a second destination location (e.g., a second office in Washington D.C.), to a third destination location (e.g., a third office in Chicago, Ill.), and to the return location (e.g., the user's office in San Jose, Calif.). The user can input multiple destinations by first selecting an "add destination" feature (not shown in FIG. 2), for example, on the input interface 200 to add multiple destinations.

When the user has finished inputting the set of initial trip information, the user can select a "search," "recommend," or "order" feature, or in the example of FIG. 2, the feature 295, to cause the reservation system to process the information and provide the user with one or more recommended itineraries for the trip for the user.

Figure 3:
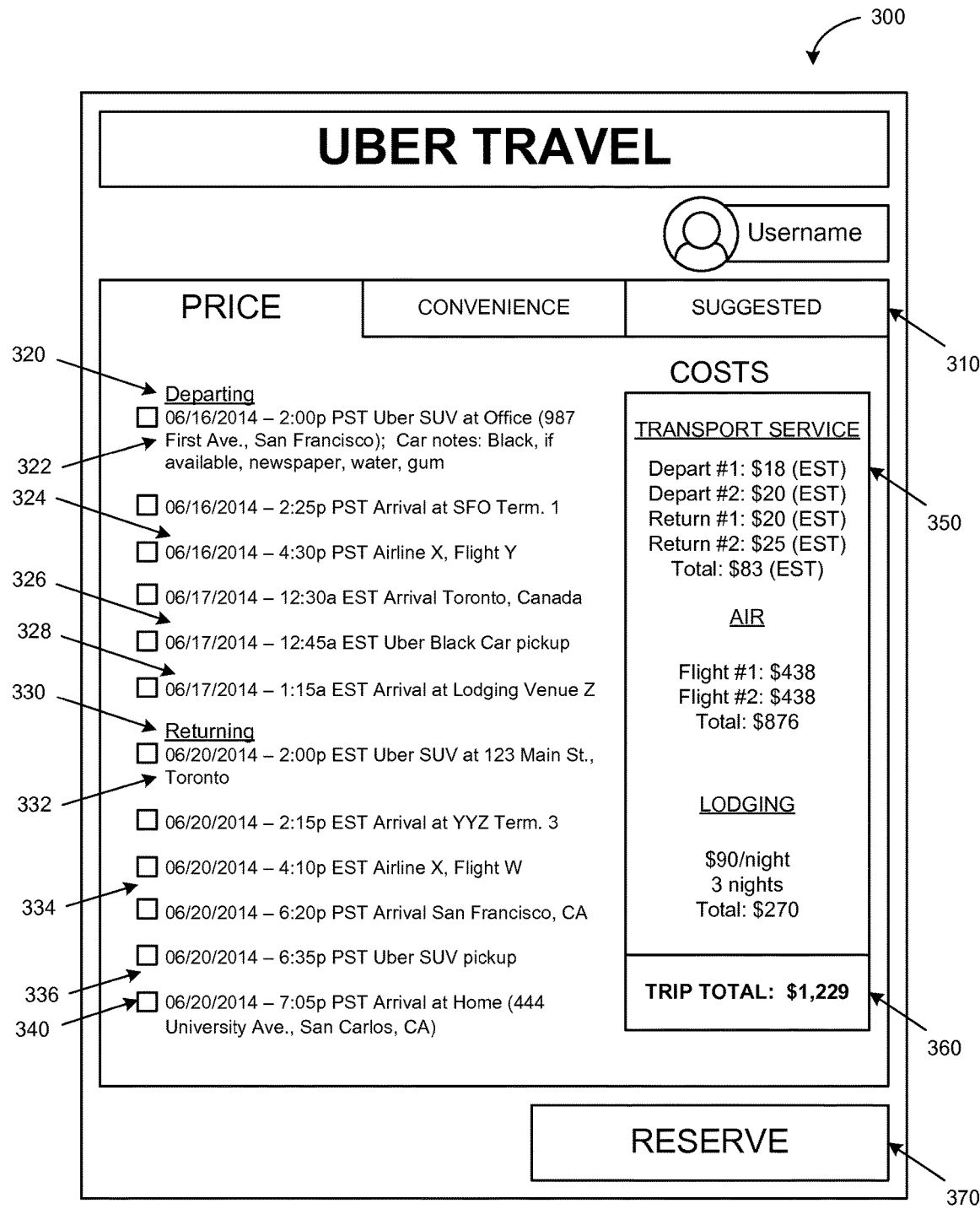
FIG. 3 illustrates an example user interface showing one or more recommended itineraries for a trip based on the user's travel information.

FIG. 3 illustrates an example user interface showing one or more recommended itineraries for a trip based on the user's travel information. According to an example, an itinerary user interface 300 can correspond to an itinerary UI 129 of FIG. 1. After the reservation system determines one or more recommended itineraries based on the user-specified set of initial travel information, the reservation system can provide the itinerary user interface 300 to display one or more recommended itineraries. In the example of FIG. 3, a recommended itinerary that is weighted for low or lowest price is displayed in the itinerary user interface 300. The user can select one of the tabs 310 to view different recommended itineraries, such as, in the example described, a recommended itinerary based on convenience, or a recommended itinerary based on a combination of both price and convenience as well as other information, such as feedback or historical information (labeled as "suggested").

A recommended itinerary can include departure information 320, returning information 330, cost information 350, and a reserve feature 370 to reserve or order the recommended itinerary. As discussed, the reservation system can provide a comprehensive itinerary that provides transport services, travel services, and/or lodging services for a substantial entirety of the trip. A trip for the user does not just begin from the beginning of the user's first flight, but instead, begins when the user is ready to leave his home, office, or other location. In this manner, the departure information 320 and the returning information 330 together can provide an end-to-end itinerary for the user.

In the example of FIG. 3, the recommended itinerary can include, for the departure portion of the trip, a first transport service recommendation 322 from the user's specified start location to a first airport, a first flight recommendation 324 from the first airport to a second airport, a second transport service recommendation 326 from the second airport, and a first lodging recommendation 328. The recommended itinerary can also include, for the return portion of the trip, a third transport service recommendation 332 from the user's specified return pick up location to the second airport, a second flight recommendation 334 from the second airport to the first airport, and a fourth transport service recommendation 336 from the second airport to the user's specified return drop off location. The dates and/or times can also be displayed with the individual recommendations. In addition, the user can select the displayed options (e.g., the text shown for each recommendation) to view additional details of the recommendations. Still further, each of the recommendations can be changed by the user in response to the user selecting a feature 340 for individual recommendations. As discussed, changing one of the recommendations can cause other recommendations to be dynamically adjusted.

The cost information 350 can also be displayed on the itinerary user interface 300. The cost information 350 can display the cost or estimated cost for each of the different recommendations for the recommended itinerary. In addition, the total cost 360 for the recommended itinerary can also be displayed. If the user wants to reserve the recommended itinerary, the user can then select the reserve feature 370 to cause the reservation system to book or reserve the various recommendations on behalf of the user.

Methodology

Figure 4A:
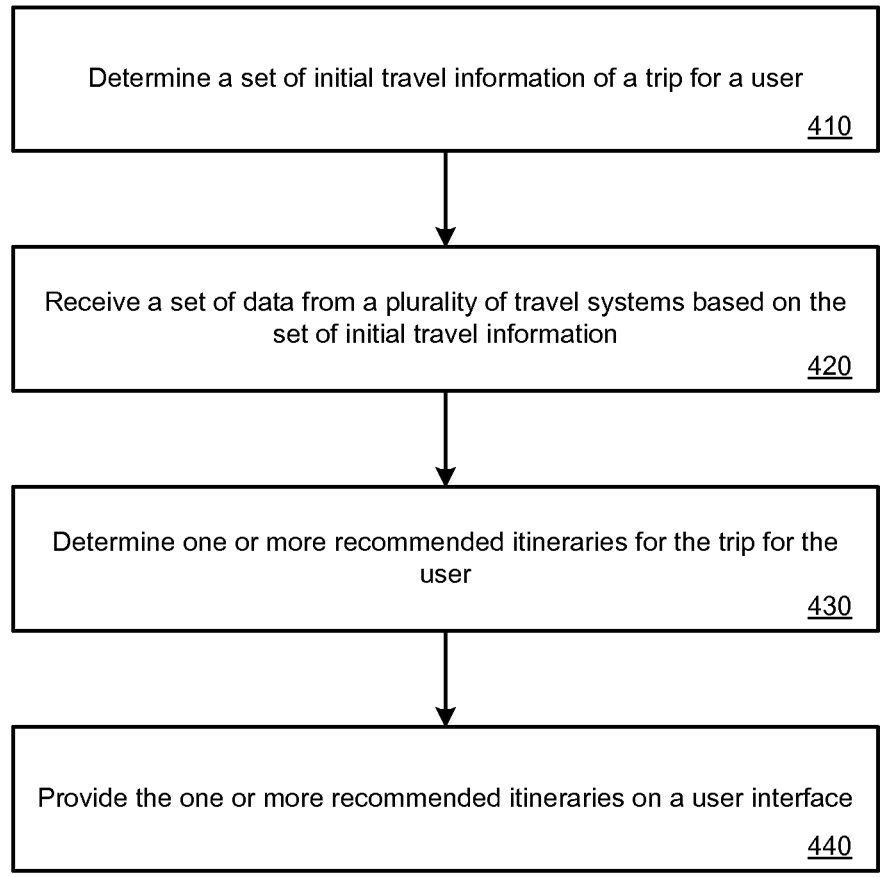
FIGS. 4A and 4B illustrate example methods for providing recommended itineraries for a trip of a user.
Figure 4B:
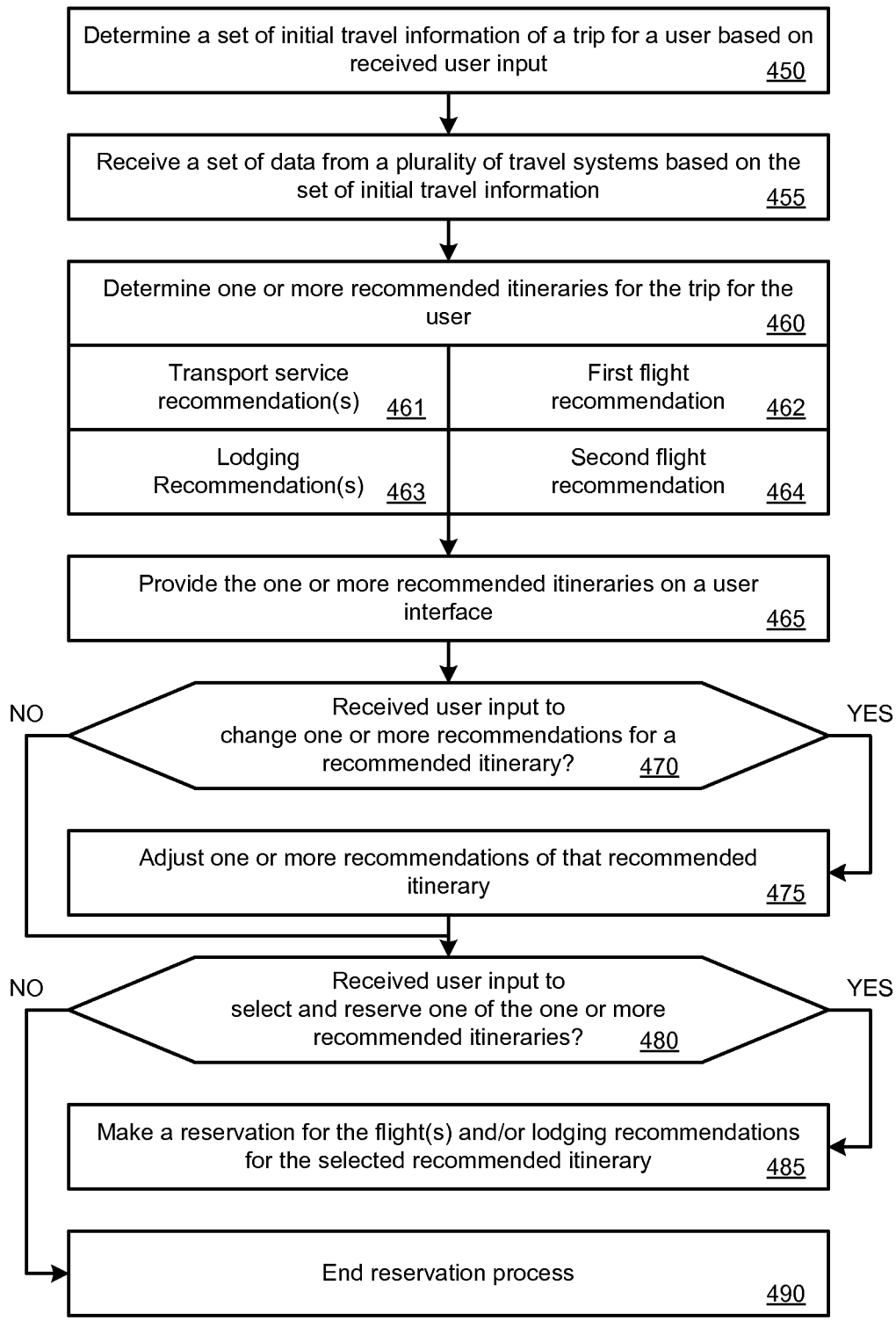

FIGS. 4A and 4B illustrate example methods for providing recommended itineraries for a trip of a user. Methods such as described by examples of FIGS. 4A and 4B can be implemented using, for example, components described with an example of FIG. 1. Accordingly, references made to elements of FIG. 1 are for purposes of illustrating a suitable element or component for performing a step or sub-step being described. In some examples, FIGS. 4A and 4B can also include additional or different steps or operations not illustrated in FIGS. 4A and 4B, such as operations described in examples of FIG. 1 through 3.

Referring to FIG. 4A, the reservation system 110 can determine a set of initial travel information of a trip for a user (410). The reservation system 110 can provide user interfaces via a portal to enable the user to provide information over one or more networks. As discussed, the set of initial travel information can include (i) a start location indicating where the trip is to begin, (ii) a start date and/or time indicating when the trip is to begin, (iii) a destination location (e.g., a location that the user wishes to travel to), (iv) a return location indicating where the trip is to end, and/or (v) a return date and/or time indicating when the trip is to end.

Based on the set of initial travel information, the reservation system 110 can receive a set of data from a plurality of travel systems, including one or more airline systems, one or more lodging systems, and/or an on-demand transport arrangement system (420). In some examples, the one or more lodging systems can also include a consumer-sharing lodging system (e.g., a lodging system in which private owners or rentals of homes, condominiums, apartments, etc., can allow other users to rent lodging) in addition to traditional hotel systems.

Using the received data form the travel systems, the reservation system 110 can determine one or more recommended itineraries for the trip (430). Each of the recommended itineraries can include a plurality of recommendations, including, for example, one or more transport service recommendations, one or more flight recommendations, and/or one or more lodging recommendations for the trip. The recommended itinerary can provide the user with travel recommendations from the start of the user's trip to the end of the user's trip. The one or more recommended itineraries can be provided on a user interface to enable the user to view, modify, and/or reserve a recommended itinerary (440).

FIG. 4B illustrates another example method for providing recommended itineraries for a trip of a user. Like FIG. 4A, the reservation system 110 can determine a set of initial travel information of a trip for a user based on received user input (450) and receive a set of data from a plurality of travel systems based on the set of initial travel information (455).

For example, the reservation system 110 can process at least a portion of the initial travel information, such as the start locations and destination locations, past feedback information, etc., to determine acceptable airports, airlines, routes, etc. (collectively referred to as airline input). The reservation system 110 can then provide airline input to the airline systems 150 to receive airline data, such as availability information, cost information, etc., of flights that are pertinent to the user's trip. Similarly, in another example, the reservation system 110 can process at least a portion of the initial travel information, such as the destination location, the return pick up location, the number of days at the destination location, etc., to determine acceptable lodging locations, hotels or shared-economy venues, etc. (collectively referred to as lodging input). The reservation system 110 can then provide lodging input to the lodging systems 160 to receive lodging data, such as availability information, cost information, etc., of lodging options that are pertinent to the user's trip.

The reservation system 110 can also communicate with an on-demand transport service to receive vehicle type information, estimated cost data (e.g., based on locations and/or time information provided by the reservation system), availability information, etc.

The reservation system 110 can determine one or more recommended itineraries for the trip for the user based on the received data, as well as based on other information (e.g., user preferences, historical data, feedback information, etc.) (460). The reservation system 110 can determine one or more recommended itineraries based on one or more rules or parameters and the received airline data and lodging data. For example, the reservation system 110 can use the airline data (e.g., including availability of good seats, such as bulk head seats, emergency exit seats, etc.) as well as the user's preference (aisle seat or window seat, or closer to the front or the back of the plane, etc.) in order to determine one or more flight recommendations. In examples, recommendations for flights can also be based one or more of flight occupancy, on-time departure scores, predicted weather during specific days or times, travel time, capacity/crowding, seat optimization, location, weather, ground traffic, past feedback from the traveler, past feedback from other travelers, etc. Flights and/or lodging recommendations can be ranked to determine options that are optimized for price, convenience, and/or best suggestion that is optimized for a combination of factors (e.g., a balanced recommended itinerary).

As discussed, a recommended itinerary can include a plurality of recommendations from a start location and/or a start date/time to an end or return location and/or a return date/time. For example, with reference to FIG. 3, a recommended itinerary can include a first, second, third, and fourth transport service recommendation (461), a first flight recommendation (462), a lodging recommendation (463), and/or a second flight recommendation (464). If the user specified additional destinations for the trip (e.g., two or more destinations in between the start and return locations), for example, additional flight recommendations and/or lodging recommendations can be provided with the recommended itinerary.

The reservation system 110 can format the results and provide the one or more recommended itineraries on a user interface to be viewable by the user (465). The user can interact with the user interface via user input to modify a recommendation on a recommended itinerary. The reservation system 110 can determine whether user input has been received to change one or more recommendations for a recommended itinerary (470). If yes, the reservation system 110 can adjust the one or more recommendations of that recommended itinerary, and if necessary, can dynamically adjust one or more other recommendations of that recommended itinerary (475). On the other hand, if no, the reservation system 110 can determine whether it has received user input to select and reserve (or order) one of the recommended itineraries (480).

If the user has not provided input to select and reserve a recommended itinerary, the reservation process ends (490). If the user provides input to select and request reservation of a recommended itinerary, the reservation system 110 can make a reservation of the recommendations (e.g., flight and/or lodging recommendation(s)) for the selected recommended itinerary on behalf of the user (485). For example, for the checkout process, the reservation system communicates with the respective airline system(s) 150, the lodging system(s) 160, and/or the on-demand transport arrangement system 170 to make individual reservations for the recommendations. A booking or confirmation number can be returned to the reservation system and/or displayed to the user. The selected recommended itinerary and a pre-paid booking code for any recommendation of the trip, including any shared-economy lodging recommendation(s) or on-demand transport service recommendation(s) of the trip, may be provided to the user. In some cases, a booking code can be used to pay at the time of service of shared-economy services by entering the booking code into the shared economies online booking application or providing the booking code directly to the operator of the shared-economy system or on-demand transport arrangement system.

As an addition or an alternative, after reserving the recommended itinerary, the reservation system 110 can also perform monitoring operations of any of the reserved transport service(s), flight(s), and/or lodging(s) to notify any of the transport service system, the airline system(s), the lodging system(s), and/or the user about changes that are occurring or are to occur (e.g., changes to times, flight changes, delays, etc.). The reservation system 110 can include a tracking component in order to alert a driver of a transport service vehicle, a lodging operator, and/or the user via email, text message, SMS message, phone call, etc., for example, when there is a change due a flight delay. Similarly, during a transport service from the start location to the first airport, for example, if the vehicle is delayed, the vehicle's location information and/or the estimated time of arrival can be provided to the reservation system 110, which can then alert other systems, such as airline systems air and/or lodging systems. In some examples, a link for real-time tracking and/or communication via text, SMS, email, or phone, can be provided to providers operating the systems.

Figure 5:
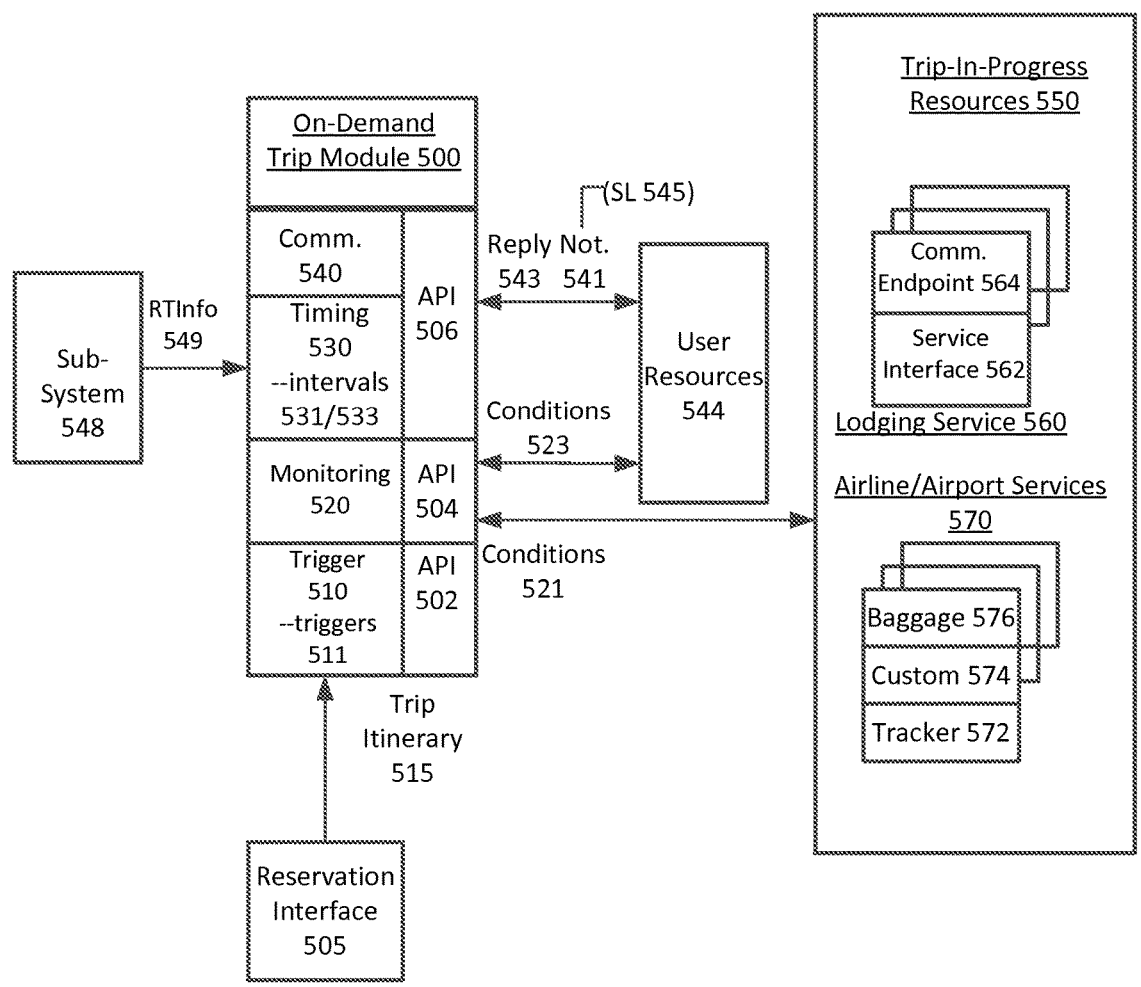
FIG. 5 illustrates an on-demand trip module ("ODTM") or service for trip planning and implementation, according to one or more embodiments.

FIG. 5 illustrates an on-demand trip module ("ODTM") or service for trip planning and implementation, according to one or more embodiments. An ODTM 500 uses a trip itinerary to monitor trip-in-progress resources ("TIPR") 550 and to perform predefined actions which facilitate implementation of a trip that is in progress. As described in greater detail, the ODTM 500 can facilitate ground transportation for the user as between an airport and a lodging. However, unlike conventional approaches, the ODTM 500 can implement triggers to provide timely communications to the traveler, in order to provide the traveler with information that is highly relevant to the travel's current trip. As described with some examples, the triggers can be based on information that is not known or available to the traveler.

One technical achievement and improvement which can be achieved is that, through implementation of ODTM 500

(or method thereof), the power level of a user's mobile computing device can be conserved at a point in travel where the mobile computing device is needed most. For example, when a business traveler lands at a destination, the mobile device is often put into instant use to check voicemail, email, messages, call home, and confirm reservations. At the same time, the duration of the flight may have drained the phone, so the mobile computing device may be operating a low power level. Examples recognize that on-demand ground transportation is often a necessary aspect of travel, but the service application requires more energy than native application such as SMS, for purpose of rendering a real-time map and/or acquiring position information and communicating the position information to the service. To alleviate the energy demand on mobile devices, some examples of FIG. 5 (i) automate and/or computationally simplify operations that would otherwise be performed by the user's device when requesting on-demand transport, and (ii) create efficiency in time for the user, allowing the user to progress through the airport and receive on-demand transport with minimal delay.

Another technical achievement and improvement that is achieved with examples as described is that the user is able to efficiently receive transport service when arriving at a destination, using a communication medium that does not distract the user. An unfamiliar airport, for example, can delay the user if the user loses attention and misses the sign. Examples recognize that any additional requirement on a user, in which the user is to use another service application to arrange a necessary service at the critical time of arrival, poses a distraction that can impede the user and lessen the user's efficiency.

In more detail, the ODTM 500 includes a trigger component 510, a monitoring component 520, timing logic 530, and a communication interface 540. Additionally, the ODTM 500 includes a plurality of application programming interfaces (APIs) 502, 504, 506, for enabling corresponding components to receive or extend communications to other resources (e.g., user device, hotel lodging, airline/airport services 570 etc.). The ODTM 500 can communicate with a reservation interface 505 in order to receive a trip itinerary 515. The reservation interface 505 can be implemented as part of the reservation system 110 (see FIG. 1), or as part of the ODTM 500. In some variations, the reservation system 110 and the ODTM 500 can be combined or integrated functionality.

From the reservation interface 505, the ODTM 500 receives the trip itinerary 515, which can be in the form of a structured (e.g., form with fields) or unstructured document. The ODTM 500 can include an intake workflow which parses the trip itinerary 515 to determine elements of the planned trip (e.g., see FIG. 3). The trigger component 510 can implement a set of triggers based on the elements of the trip. Each trigger can correspond to a programmatic placeholder which defines a criterion (or criteria) which can be satisfied by a corresponding condition. Once the condition for the trigger criteria is detected, the trigger is activated, resulting in the ODTM 500 performing a predetermined set of operations or actions. As described with other examples, the predetermined set of actions can include determining timing indications for when on-demand transportation can be requested, making reservations (e.g., for transport or other service), and/or sending notifications to the user or to parties that are relevant to the particular trip.

The monitoring component 520 can implement processes to monitor various resources for conditions 521, 523 which activate triggers 511 of a given trip when the trip is in progress. In an example of FIG. 5, the monitoring component 520 can monitor information provided by lodging resources 560 and/or airline/airport resources 570. With regard to airline/airport resources 570, separate network services may can be monitored, depending on the triggers for the trip. In one embodiment, the airline/airport services 570 include a flight tracker 572, which provide information about a flight that is in progress, as well as the departure and arrival gates, and whether the flight is on time or early/late. The airline/airport services 570 may also include a custom tracker 574, which can track information that is indicative of the length of the customs check for international flights. For example, airports may publish a waiting time for arrivals at the international terminal. Likewise, airline/airport services 570 can include baggage interface 576. The baggage interface 576 can be provided by an airline or an airport, as a network service that publishes baggage terminals and baggage delivery times for arriving flights.

The monitoring component 520 can also check user resources 544 for information that is indicative of other types of conditions 523. The user resources 544 can include a mobile computing device of the user, which can be selectively monitored (with user permission) for information such as (i) user's location, (ii) user's service application activity (e.g., for the on-demand service), and/or (iii) time period when mobile computing device is off and on.

When the trip itinerary 515 is received, the monitoring component 520 can be scheduled to perform monitoring for the trip. In one implementation, the monitoring component 520 can verify the user is going on the trip. For example, the user may have a reservation, and the monitoring component 520 can monitor the user location before the flight departure to ensure the user is keeping the reservation. Other indicators from user activity/inactivity can also be used as confirmation.

On arrival to the destination, the triggering component 510 and the monitoring component 520 can combine to (i) detect the user's arrival, e.g., at an airport, (ii) implement a process or series of communications by which the user is able to obtain on-demand ground transportation in a most efficient manner, and (iii) provide automation with respect to notifications of interested or relevant parties with respect to the current trip. To detect the user's arrival, the monitoring component 520 can interface with the flight tracker 572 to determine when the flight of the user is complete. Once the user's flight is complete, triggers 511 can be activated for implementing a process or series of notifications for efficiently delivering the user to an on-demand ground transportation service. The triggers 511 can result in the communication interface 540 sending the user one or more notifications 541. The notifications 541 can be through a messaging protocol such as SMS, email, or other service (including through the service application).

In one example, the notifications 541 issued through the communication interface 540 can include or provide a guide, such as a map or walking direction, for guiding the user from the arrival gate to a pickup location for the on-demand transport. The guide can optionally direct the user through baggage claim. The itinerary 515 can, for example, include information about whether the user has baggage, or the user can make a selection from the guide as to whether they have baggage or not. If the user has baggage, the monitoring component 520 may determine from the baggage component 576 when and which baggage terminal the user should go to, and further directions on walking to the baggage terminal. The guide provided to the user can be specific as to (i) what floor of the airport the user should be on to receive the on-demand transport; (ii) what door nearest the baggage claim the user should walk through to receive or request on-demand transport; (iii) permissible locations where the user may stand to request or receive on-demand transport; and/or (iv) the location of a stand or designated area where the ground transport can be received. In guiding the user to through the arrival, the monitoring component 520 can also communicate with the mobile computing device of the user, which can provide location information using the device's geo-aware resources. In one implementation, the guide can be provided through a series of text messages, as a mechanism to conserve power.

As an addition or alternative, the notifications 541 can serve to enable the user to time the request for transport. On-demand services typically have a wait time, which can range from less than one minute to several minutes, depending on a variety of factors. For the most efficient delivery of the user through the airport and to the next place of the trip (e.g., lodging), embodiments recognize that the user's wait time for receiving on-demand transport should be minimized. However, it is also a waste of resources for the on-demand provider to wait for the user, as the provider can be servicing individuals who are ready to receive transport. Thus, it is not beneficial for the service if the user makes the request too early, causing the provider to wait (or causing the provider to circle around). An embodiment of FIG. 5 recognize an optimal request time places the user at the pickup location when the provider arrives. While such precise timing may not always be possible, the ODTM 500 can implement timing logic 530 to optimize the user's arrival to the pickup location. By "optimizing" the timing logic 530 implements a cost/optimization formula which results in better coordination, subject to cost and approximation error.

In order to request transport service, the ODTM 500 can enable text message requests. Optionally, the text message requests can be prompted from the user as a reply message 543 to a notification 541. By using SMS, for example, battery life of the user's mobile computing device can be preserved. In variations, the ODTM 500 can simply request the transport service on behalf of the user.

In one implementation, the timing component 530 uses a combination of airport information (static), user information, service demand information (dynamic) and airport traffic congestion (dynamic) to determine a request time interval for the user. In determining the dynamic information such as available drivers and demand for the service, the ODTM 500 can include or access a sub-system 548 which tracks the geo-aware resources of the mobile devices of drivers and users in order to provide real-time information 549 affecting the status of the transport service. The supply for a user at a given airport can be based on available drivers within a defined vicinity of the airport.

In variations, the supply can be based on available drivers and drivers who are on assignment with a passenger, who will arrive at the airport (or within the vicinity) within a designated duration of time. The demand for the transport service can be based on a variety of sources, including the number of users who have requested transport services from ODTM 500, the number of users who have itineraries or reservations for receiving the on-demand transport, the number of users who have turned on a service application from which a transport request has been made, historical data as to time or day, and/or statistical approximation based on number of arriving passengers in a relevant time period.

The request time interval 531 can be communicated to the device of the user, and can identify a length of time which will likely be needed for a service provider to arrive at a pickup location nearest to the user's location at the airport, once the user makes the request. With the request time interval 531, the user can estimate an appropriate time to make the request for transport.

An example of FIG. 5 also recognizes, however, that the user may not know how much time he needs to arrive at the pickup location. Accordingly, some examples provide for a time-to-reach pickup interval 533 to be determined for the user. For example, the user has to traverse from the gate to baggage claim (or through door when no baggage is checked), and while the user does not know how long this may take, the ODTM 500 can use an airport map to estimate distance and walking pace. Moreover, the timing component 530 can include time for baggage pickup, and further after estimates based on the arrival gate of the user (which can be determined from the monitoring component 520). The time-to-reach pickup interval 533 can be tallied for the user to facilitate their timing of the request. While map and distance measurements can be used to estimate the time-to-reach pickup interval 533, examples recognize that with enough users, the information can be determined statistically, based on actual user measurements.

Furthermore, an example of FIG. 5 also recognizes that the user's determination of when to request transport may be biased towards the service provider arriving early. Accordingly, the ODTM 500 can optionally be implemented to assign a trigger for when the user should request transport. When the ODTM 500 makes the decision, the on-demand transport service can preserve availability of providers and avoid congestion or situations where providers have to circle around. For example, a trigger can be set to the condition that when the request time interval 531 is approximately equal to the time-to-reach pickup interval 533 (or alternatively, when the request time interval 531 is a few minutes more than the time-to-reach pickup interval 533 to avoid early arrival of service provider), a notification 541 is sent to the user device, signaling the user to request the transport service. This can occur when, for example, the user is at baggage claim, or walking from the gate to the baggage claim. The fact that the user has to go to baggage claim can be set as a condition in which the timing interval for the user to reach the pickup location is increased. Similar allotment can be made for when the user has to pass through customs.

In variations, the request for on-demand transport can be made automatically, from the ODTM 500, when the corresponding trigger is activated. When the request is made automatically, the user information can be communicated to the driver, and a confirmation of the request being made and/or being accepted can be communicated to the user. When the provider is on route, the user can be given an estimated time to arrival for the provider.

The timing of the notification (or automated transport request) can vary based on dynamic real-time information 549, such as the demand for service providers and the corresponding supply, as well as traffic or congestion near the airport. As the timing of the optimal instance for requesting the on-demand transport is based on information that is not available to the user (e.g., the dynamic information of available service providers and demand thereof, as well as traffic or congestion) an embodiment as described provides another instance of an achievement in efficiency of operation that is technical, and outside the realm of manual involvement.

In some variations, the notifications 541 can be structured or communicated through a transport that enables the user to reply, either with information or with questions. For example, if the user stops to use the bathroom, he can send a reply notification 543, which the communication interface 540 can parse to determine that the user progress through the airport may be delayed.

The communication interface 540 can also structure links 545 in notifications 541 which can be selected by the user to (i) launch the user's service application, and (ii) receive updated application data specific to the user's current state (e.g., current location, whether transport has been requested, time of arrival, etc.) of the user. In one implementation, the communication interface 540 initiates an instance of the user's service application at a determined moment after when the user's flight arrives at the destination. For example, the trigger component 510 can trigger the communication interface 540 to initiate an instance of the user's service application at a particular moment in time after the user's flight arrives. The moment in time can be a constant (e.g., 5 minutes after landing), conditional (e.g., upon user replying to a text message), or even variable (e.g., based on time of user to arrive to pickup location). When communicated through a medium such as SMS, the notifications can embed the link 545 which links to updated application state information for the instance of the application which is running on the communication component 540. With selection of the link 545, the service application may launch on the user device, and the service application may identify the application state information from the communication interface 540 so that the service application running on the user device is quickly up to date.

Throughout the timeline of when the user arrives at the destination, receives the on-demand transport, and travels to the place of interest, the trigger component 510 and monitoring component 520 continue to monitor for pre-defined conditions in order to anticipate next actions. For example, if the user's flight was on time, but the user's arrival to the transport provider was late, the monitor 520 can detect a delay as an expected schedule, and the triggering component 510 can trigger the communication component 540 to generate (and optionally send) a communication (e.g., email, SMS) to a relevant part of the place of interest. The relevant party can be, for example, a lodging host, a hotel front desk, or a person whom needs the user has previously indicated as being a contact for the place of interest (e.g., business associate whom a meeting is with). These other parties can be accessed as TIPR 550. For example, a notification to the lodging can include (i) the communication component 540, selecting a transport (e.g., SMS, email) for a particular lodging service 560 in order to convey information. The lodging transport 560 can, in some instances include a service interface 562 (e.g., network interface, website, email address) where notifications can be received. In other instances, the lodging can, for example, be hosted by a private individual (e.g., AIRBNB) and the communication can be configured for a communication end point 564, such as an email address or cellular phone number.

While examples as described serve to conserve the power level (e.g., battery life, battery power level, etc.) of a user's mobile computing device in a situation where the power level can be low, a variation also provides for a contingency of the user being without use of the mobile computing device (e.g., the mobile computing device becomes fully drained). Under conventional approaches when such scenarios occur, the user is not able to request on-demand service. However, in examples provided, the itinerary 515 is known, which sets a schedule that is predictive of the user's progress through the airport. Moreover, the monitoring component 520 can confirm when the user's flight arrives at the destination. The use of schedule information enables the ODTM 500 to provide a contingency plan for the user, in order to enable the user to receive on-demand transportation when the user's mobile computing device is not operative. The contingency plan can be activated by the triggering component 510 when conditions such as the user failing to respond to text messages, or the user failing to turn his or her device on, are detected. As part of the contingency plan, one implementation provides that the user is provided, in advance (e.g., with the travel itinerary) (i) a code, such as a 4 sequence numeral or word, and/or (ii) directions to where the user is to wait for pickup or stand for on-demand travel, and/or (iii) the duration of time the user is to wait. While the user name or other identifier can suffice, the code enables the user to preserve his privacy and personal information.

When the contingency plan is triggered, the ODTM 500 can perform one or more of the following operations: (i) request transport for the user at an appropriate time (e.g., ten minutes after flight arrives), (ii) identify the code to an operator or driver who is assigned to pick up the passenger, (iii) identify the passenger by picture or otherwise (e.g., by biometric data such as fingerprint), and/or (iv) communicate to the driver the place of interest (as determined from the itinerary 515). In this way, the user who arrives without use or availability of the mobile computing device can progress through the airport with the expectation that he or she will receive on-demand transport.

Figure 6:
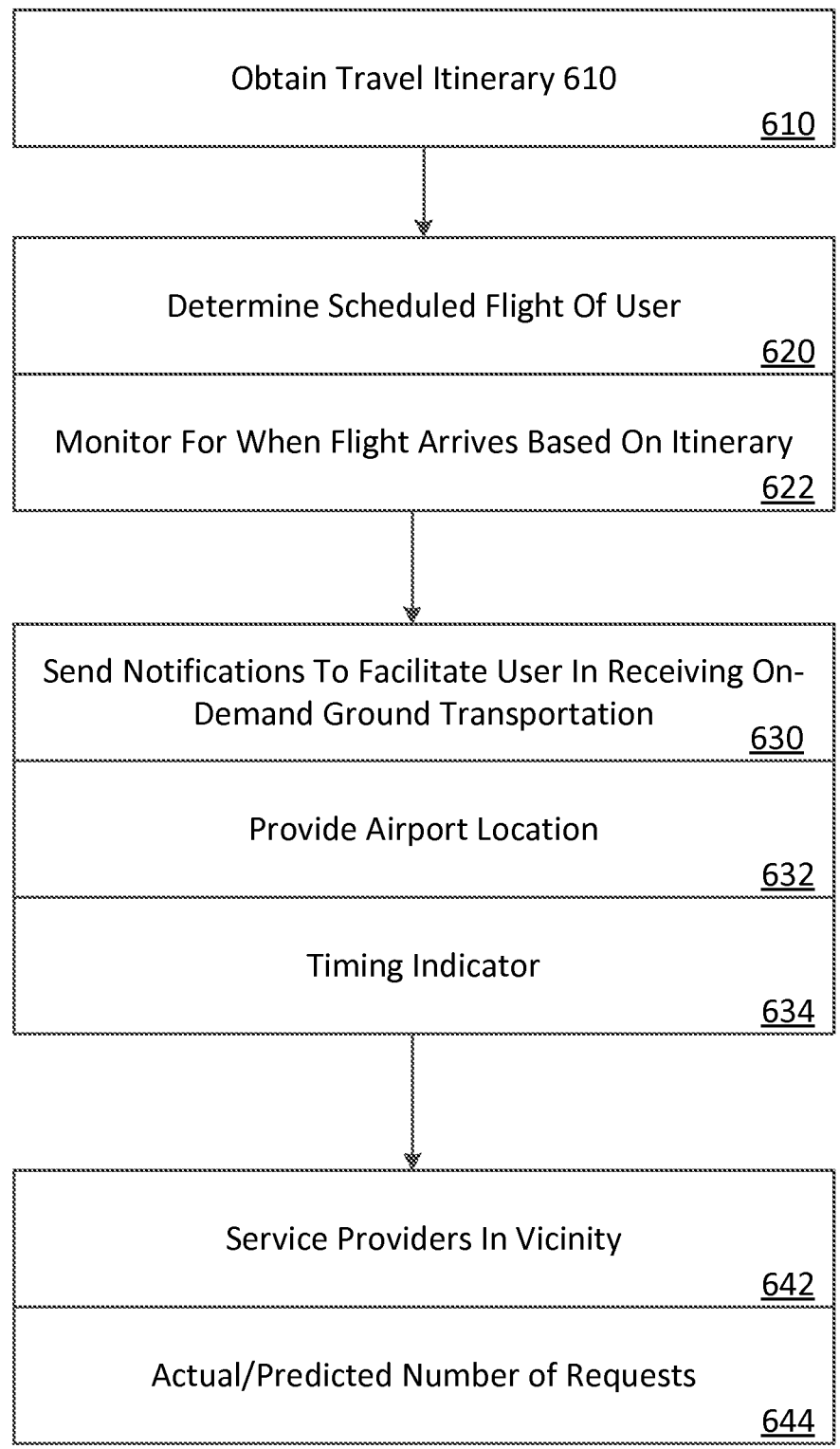
FIG. 6 illustrates an example of a method which can be implemented using an example such as described with FIG. 5.

FIG. 6 illustrates an example of a method which can be implemented using an example such as described with FIG. 5. In describing a step or sub-step being described, reference may be made to elements of FIG. 5 for purpose of illustrating suitable components or elements for performing a step or sub-step being described.

With reference to an example of FIG. 6, a travel itinerary for a user may be obtained (610). For example, a reservation system 110 (see FIG. 1) or sub-system may be used to determine the user's itinerary, as described with various embodiments. From the itinerary, a scheduled flight of the user is identified and monitored (620). For example, the monitoring component 520 may monitor the tracker 572 using an appropriate API (502, 504, or 506). The monitoring includes determining when the flight arrives at the destination (622).

Once the flight is determined to arrive, the ODTM 500 can implement triggers which include sending the user one or more notifications or messages (630) containing information for facilitating the user in requesting and/or receiving transport services. The information can include (i) a location at the airport where the user can be picked up in connection with receiving the on-demand transportation service (632), and (ii) a tinning indicator to indicate when a request to receive the on-demand transportation service should be made (634). The tinning indicator can be based on a variety of factors that take into account both the time needed for a transport request to be fulfilled with the arrival of a transport provider to the pickup location (e.g., request time interval 531), and a time duration needed for the passenger to arrive at a pickup location (e.g., time-to-reach pickup interval 533). Determinations such as the request time interval 531 and the time-to-reach pickup interval 533 can utilize variable or dynamic information, including information that is outside of the knowledge of the user.

For example, the determination of the request time interval 531 may based on real-time and/or predictive information in regards to a determination of a number of available service providers in a vicinity of the airport (642), as well as a real-time determination of a number of requesters for the transport service (644). The available service providers can be determined based on an expectation of when the user will request the transport service. Thus, for example, the determination can include an estimation of available vehicles that takes into account the number of currently available vehicles which will become unavailable when the transport request is made, and the number of currently unavailable vehicles which will become available in the vicinity of the airport when the transport request is made. Likewise, the real-time determination of requesters can include an expectation of demand at the moment when the user makes the transport request. This information can be based on historical information, statistical data (e.g., number of travelers in the airport versus percentage of travelers who use on-demand ground transportation), reserved or planned on-demand transportation requests (which can be compiled from itineraries of other travelers) and/or mobile computing device/application activity of users.

The timing indicator of the passenger may also be a dynamic and real-time determination, subject to events specific to the user (e.g., bathroom stop). Information such as (i) a determination (e.g., from the itinerary 515) of whether the user has baggage, and (ii) a gate of arrival can be used to plot and predict when the user has traversed through the airport.

With these determinations in mind, the request for transport can be optimally timed to reduce the user's wait time, while avoiding the service provider from having to wait for the user.

Hardware Diagram

Figure 7:
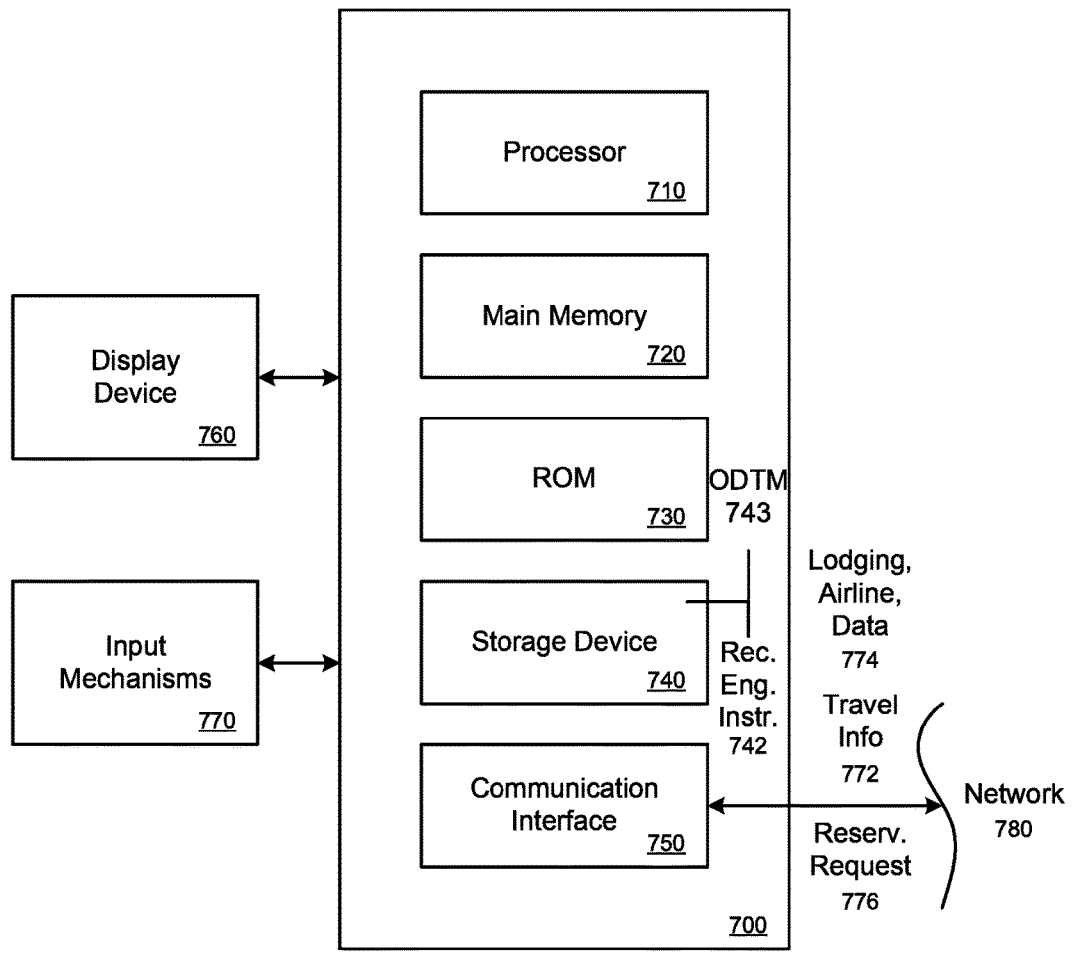
FIG. 7 is a block diagram that illustrates a computer system upon which examples described herein may be implemented.

FIG. 7 is a block diagram that illustrates a computer system upon which examples described herein may be implemented. For example, in the context of FIG. 1, the reservation system may be implemented using a computer system such as described by FIG. 7. System 700 may also be implemented using a combination of multiple computer systems as described by FIG. 7.

In one implementation, computer system 700 includes processing resources 710, a main memory 720, a ROM 730, a storage device 740, and a communication interface 750. Computer system 700 includes at least one processor 710 for processing information and a main memory 720, such as a random access memory (RAM) or other dynamic storage device, for storing information and instructions to be executed by the processor 710. Main memory 720 also may be used for storing temporary variables or other intermediate information during execution of instructions to be executed by processor. Computer system 700 may also include a read only memory (ROM) 730 or other static storage device for storing static information and instructions for processor. A storage device 740, such as a magnetic disk, a solid-state storage, or an optical disk, is provided for storing information and instructions. For example, the storage device 740 can correspond to a computer-readable medium that stores recommendation engine instructions 742 for performing operations discussed with respect to FIGS. 1 through 4B and ODTM instructions 743 for performing operations discussed with respect to FIGS. 5 and 6.

The communication interface 770 can enable computer system 700 to communicate with one or more networks 780 (e.g., cellular network) through use of the network link (wireless or via a wire). Using the network link, computer system 700 can communicate with a plurality of travel systems and can provide a portal to be accessible by users operating their respective computing devices. According to some examples, computer system 700 can receive a set of initial travel information 772 for a trip of a user from a user's computing device via the network link. The recommendation engine instructions 742 can be executed by the processor 710 to implement the recommendation engine in order to (i) receive a set of data 774 from airline and/or lodging system(s) based on the set of initial travel information 772, (ii) determine one or more recommended itineraries for the trip, and (iii) in response to a user request to reserve a selected recommended itinerary, transmit reservation requests 776 to the respective airline and/or lodging system(s) that provide the travel recommendations in the selected recommended itinerary.

Computer system 700 can also include a display device 760, such as a cathode ray tube (CRT), an LCD monitor, or a television set, for example, for displaying graphics and information to a user. An input mechanism 770, such as a keyboard that includes alphanumeric keys and other keys, can be coupled to computer system 700 for communicating information and command selections to the processor 710. Other non-limiting, illustrative examples of input mechanisms 770 include a mouse, a trackball, touch-sensitive screen, or cursor direction keys for communicating direction information and command selections to the processor 710 and for controlling cursor movement on display.

Examples described herein are related to the use of computer system 700 for implementing the techniques described herein. According to one example, those techniques are performed by computer system 700 in response to the processor 710 executing one or more sequences of one or more instructions contained in main memory 720, such as the recommendation engine instructions 742. Such instructions may be read into main memory 720 from another machine-readable medium, such as the storage device 740. Execution of the sequences of instructions contained in main memory 720 causes the processor 710 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is being claimed is:

1. A non-transitory computer-readable medium storing instructions that, when executed by one or more processors of a network computer system, cause the network computer system to:

communicate, over one or more networks, with a mobile computing device of a user and a mobile computing device of each service provider of a plurality of service providers;

determine a scheduled flight to a destination from a travel itinerary for the user;

monitor, over the one or more networks, a flight tracker to detect when the scheduled flight arrives at the destination;

upon detecting the scheduled flight arriving at an airport of the destination:

receive, over the one or more networks, location information from a geo-aware resource of the mobile computing device of the user, the location information indicating a current location of the user;

determine a time-to-reach pickup interval, based at least on the current location of the user, the time-to-reach pickup interval indicating an estimated amount of time for the user to travel from the current location of the user to a pickup location at the airport where the user can receive an on-demand ground transportation service;

receive, over the one or more networks, location information from a geo-aware resource of the mobile computing device of each service provider of a plurality of available service providers within a vicinity of the airport, the location information indicating a current location of each service provider;

determine a request time interval of a selected service provider of the plurality of available service providers, based on a current location of the selected service provider, the request time interval indicating an estimated amount of time for the selected service provider to travel from the current location of the selected service provider to the pickup location;

transmit, over the one or more networks, a notification to the mobile computing device of the user, the notification providing information about the pickup location;

determine a computed request time based on the request time interval and the time-to-reach pickup interval, the computed request time indicating a time to trigger a service request such that the user arrives at the pickup location approximately when the selected service provider arrives at the pickup location; and automatically trigger the service request by transmitting, over the one or more networks, request information to the mobile computing device of the selected service provider at the computed request time, the request information identifying the pickup location and including user information associated with the user.

2. The non-transitory computer-readable medium of claim 1, wherein the notification includes a text notification with a link to an application.

3. The non-transitory computer-readable medium of claim 2, wherein execution of the instructions by the one or more processors further cause the network computer system to:

structure the link to provide updated application information that is specific to the user.

4. The non-transitory computer-readable medium of claim 1, wherein the computed request time is further based on an estimation of a demand for the on-demand ground transportation service.

5. The non-transitory computer-readable medium of claim 4, wherein the estimation of the demand is based on an estimation of a number of open service requests and a number of predicted service requests for the on-demand ground transportation service in a given duration corresponding to the computed request time.

6. The non-transitory computer-readable medium of claim 5, wherein the computed request time is further based at least in part on a predicted time for the user to locate baggage.

7. The non-transitory computer-readable medium of claim 5, wherein the computed request time is further based at least in part on a predicted time for the user to pass through customs.

8. The non-transitory computer-readable medium of claim 1, wherein the information provided in the notification includes a map indicating the pickup location for receiving the on-demand ground transportation service.

9. The non-transitory computer-readable medium of claim 8, wherein execution of the instructions by the one or more processors further cause the network computer system to:

determine an arrival terminal at which the user is located;

wherein the map identifies the pickup location that is specific to the arrival terminal.

10. A network computer system comprising:

a network communication interface to communicate, over one or more networks, with a mobile computing device of a user and a mobile computing device of each service provider of a plurality of service providers;

one or more processors; and a memory that stores a set of instructions, that when executed by the one or more processors, cause the network computer system to:

determine a scheduled flight to a destination from a travel itinerary for the user;

monitor, over the one or more networks, a flight tracker to detect when the scheduled flight arrives at the destination;

upon detecting the scheduled flight arriving at an airport of the destination:

receive, over the one or more networks, location information from a geo-aware resource of the mobile computing device of the user, the location information indicating a current location of the user;

determine a time-to-reach pickup interval, based at least on the current location of the user, the time-to-reach pickup interval indicating an estimated amount of time for the user to travel from the current location of the user to a pickup location at the airport where the user can receive an on-demand ground transportation service;

receive, over the one or more networks, location information from a geo-aware resource of the mobile computing device of each service provider of a plurality of available service providers within a vicinity of the airport, the location information indicating a current location of each service provider;

determine a request time interval of a selected service provider of the plurality of available service providers, based on the current location of the selected service provider, the request time interval indicating an estimated amount of time for the selected service provider to travel from the current location of the selected service provider to the pickup location;

transmit, over the one or more networks, a notification to the mobile computing device of the user, the notification providing information about the pickup location;

determine a computed request time based on the request time interval and the time-to-reach pickup interval, the computed request time indicating a time to trigger to a service request such that the user arrives at the pickup location approximately when the selected service provider arrives at the pickup location; and automatically trigger the service request by transmitting, over the one or more networks, request information to the mobile computing device of the selected service provider at the computed request time, the request information identifying the pickup location and including user information associated with the user.

11. The network computer system of claim 10, wherein the notification includes a text notification with a link to an application.

12. The network computer system of claim 11, wherein execution of the set of instructions by the one or more processors further cause the network computer system to:
structure the link to provide updated application information that is specific to the user.

13. The network computer system of claim 10, wherein the computed request time is further based on an estimation of a demand for the on-demand ground transportation service.

14. The network computer system of claim 13, wherein the estimation for the demand is based on an estimation of a number of open service requests and a number of predicted service requests for the on-demand ground transportation service in a given duration corresponding to the computed request time.

15. The network computer system of claim 14, wherein the computed request time is further based at least in part on a predicted time for the user to locate baggage.

16. The network computer system of claim 14, wherein the computed request time is further based at least in part on a predicted time for the user to pass through customs.

17. The network computer system of claim 10, wherein the information provided in the notification includes a map indicating the pickup location for receiving the on-demand ground transportation service.

18. The network computer system of claim 17, wherein execution of the set of instructions by the one or more processors further cause the network computer system to:
determine an arrival terminal at which the user is located;
wherein the map identifies the pickup location that is specific to the arrival terminal.

* * * * *